(12) United States Patent
Rohrbach

(10) Patent No.: US 11,852,497 B2
(45) Date of Patent: Dec. 26, 2023

(54) METHOD FOR DETECTING FALSE POSITIVES OF AN IMAGE-PROCESSING DEVICE OF A CAMERA

(71) Applicants: Renault s.a.s., Boulogne-Billancourt (FR); NISSAN MOTOR CO., LTD., Yokohama (JP)

(72) Inventor: Thibault Rohrbach, Boulogne Billancourt (FR)

(73) Assignees: Renault s.a.s., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 470 days.

(21) Appl. No.: 17/273,605

(22) PCT Filed: Jul. 8, 2019

(86) PCT No.: PCT/EP2019/068261
§ 371 (c)(1),
(2) Date: Mar. 4, 2021

(87) PCT Pub. No.: WO2020/048659
PCT Pub. Date: Mar. 12, 2020

(65) Prior Publication Data
US 2021/0256275 A1  Aug. 19, 2021

(30) Foreign Application Priority Data
Sep. 6, 2018 (FR) .................. 18 70996

(51) Int. Cl.
*G06K 9/00* (2022.01)
*G01C 21/36* (2006.01)
(Continued)

(52) U.S. Cl.
CPC ......... *G01C 21/3602* (2013.01); *B60W 30/12* (2013.01); *B60W 50/14* (2013.01);
(Continued)

(58) Field of Classification Search
CPC ........................ G06V 20/588; B60W 50/14
See application file for complete search history.

(56) References Cited

U.S. PATENT DOCUMENTS 6,813,370 B1* 11/2004 Arai .................. G06V 10/457
340/919
9,063,548 B1 6/2015 Ferguson et al.
(Continued)

FOREIGN PATENT DOCUMENTS

EP    1 089 231 A2   4/2001

OTHER PUBLICATIONS

International Search Report dated Oct. 7, 2019 in PCT/EP2019/068261 filed on Jul. 8, 2019, 2 pages.

*Primary Examiner* — Emily C Terrell
*Assistant Examiner* — Owais Iqbal Memon
(74) *Attorney, Agent, or Firm* — Oblon, McClelland, Maier & Neustadt, L.L.P.

(57) ABSTRACT

A method detects false positives of an image-processing device of a camera located on-board a vehicle and that delivers data for modelling a marking line. The method includes: determining a first distance from the vehicle to the marking line at a first instant in time, determining a second distance from the vehicle to the marking line at a second instant, computing an initial discontinuity, in which an initial discontinuity equal to the absolute value of the difference between the first distance and the second distance is computed, and detecting a false initial-discontinuity positive, in which the initial discontinuity is compared to a predefined initial low threshold.

10 Claims, 4 Drawing Sheets

(51) Int. Cl.
*B60W 30/12* (2020.01)
*B60W 50/14* (2020.01)
*G06V 20/56* (2022.01)
*G06V 10/98* (2022.01)

(52) U.S. Cl.
CPC ............ *G06V 10/98* (2022.01); *G06V 20/588* (2022.01); *B60W 2420/42* (2013.01)

(56) References Cited

U.S. PATENT DOCUMENTS

| | | | | |
|---|---|---|---|---|
| 2006/0233425 | A1* | 10/2006 | Kobayashi | G06V 20/588 |
| | | | | 382/106 |
| 2010/0001883 | A1* | 1/2010 | Koenig | B62D 15/029 |
| | | | | 340/988 |
| 2012/0033074 | A1* | 2/2012 | Spangenberg | B60W 40/04 |
| | | | | 348/148 |

* cited by examiner

[Fig 8b]

METHOD FOR DETECTING FALSE POSITIVES OF AN IMAGE-PROCESSING DEVICE OF A CAMERA

The invention relates to the field of vehicles equipped with a driver-assistance system.

The invention pertains to a method for detecting false positives of an image-processing device of a camera.

Vehicles comprising at least one camera comprising an image-processing device able to deliver modelling data of a marking line of a lane of a vehicle are known in the prior art.

Prior-art camera image-processing devices are not always very reliable, in particular when the vehicle is being driven in a lane that has been poorly maintained or when there is ambiguity in the detection of the markings. False marking-line detection may result in untimely correction of vehicle trajectory. This decreases the comfort of the passengers of the vehicle and may lead users to distrust autonomous or semi-autonomous driving systems.

The aim of this invention is to provide a method for detecting false positives of a camera image-processing device allowing false detection positives and the associated discomfort to be avoided.

The invention relates to a method for detecting false positives of an image-processing device of a camera located on-board a vehicle 1, said image-processing device being able to deliver modelling data of a marking line of a lane of the vehicle in a frame of reference that is tied to the vehicle, the method for detecting false positives comprising the following steps:
  a first step of determining, from the modelling data of the marking line, a first distance of the vehicle to the marking line, at a first instant in time,
  a second step of determining, from the modelling data of the marking line, a second distance of the vehicle to the marking line, at a second instant in time,
  an initial-discontinuity-computing step in which an initial discontinuity is computed, the initial discontinuity being equal to the absolute value of the difference between the first distance and the second distance,
  a step of detecting a false initial-discontinuity positive, in which step the initial discontinuity is compared to a preset low initial threshold, a false initial-discontinuity positive being detected if the initial discontinuity is larger than the low initial threshold.

According to one aspect of the invention, the low initial threshold is equal to a value comprised between 0.1 meters and 0.3 meters, the time difference between the first instant and the second instant being smaller than or equal to the quotient of the low initial threshold divided by a lateral speed substantially equal to two meters per second, the time difference being larger than one millisecond.

According to one aspect of the invention, the initial discontinuity is furthermore compared to a preset high initial threshold, a false initial-discontinuity positive being detected if the initial discontinuity is larger than the low initial threshold and smaller than the high initial threshold.

According to one aspect of the invention, the high initial threshold is equal to a value comprised between 1.7 meters and 2.3 meters.

According to one aspect of the invention, the frame of reference comprises an ordinate axis substantially parallel to a lateral direction of the vehicle and an origin located level with the camera of the vehicle, the first distance and the second distance corresponding to the ordinate at the origin of a point of the marking line at the first instant and at the second instant in time, respectively.

According to one aspect of the invention, the frame of reference comprises an abscissa axis substantially parallel to a longitudinal direction of the vehicle, the method for detecting false positives furthermore comprising the following steps:
  a third step of determining, from the modelling data of the marking line, a first ordinate of a horizon point of the marking line the first abscissa of which is a distance corresponding to the distance to be travelled by the vehicle in a predefined horizon time, at the first instant in time,
  a fourth step of determining, from the modelling data of the marking line, a second ordinate of a horizon point of the marking line the second abscissa of which is a distance corresponding to the distance to be travelled by the vehicle in said predefined horizon time, at the second instant in time,
  a horizon-discontinuity-computing step in which a horizon discontinuity is computed, the horizon discontinuity being equal to the absolute value of the difference between the first ordinate and the second ordinate, minus the initial discontinuity,
  a step of detecting a false horizon-discontinuity positive, in which step the horizon discontinuity is compared to a preset horizon threshold, a false horizon-discontinuity positive being detected if the horizon discontinuity is larger than the horizon threshold.

According to one aspect of the invention, the predefined horizon time is a value comprised between 0.9 seconds and 1.1 seconds and the horizon threshold is a value comprised between 0.2 meters and 1 meter.

According to one aspect of the invention, the modelling data comprising an optimal visibility distance, the method for detecting false positives furthermore comprises a step of detecting a false range positive, in which step the optimal visibility distance is compared to a range threshold equal to the distance to be travelled by the vehicle in a predefined range time, a false range positive being detected if the optimal visibility distance is smaller than the range threshold.

According to one aspect of the invention, the predefined range time is a value comprised between 0.8 seconds and 0.99 seconds.

According to one aspect of the invention, the method for detecting false positives furthermore comprises a step of displaying a visual warning to a user of the vehicle if a false positive among a false initial-discontinuity positive, a false horizon-discontinuity positive and a false range positive is detected, in order to warn the user of a temporary loss of detection of the marking line by the camera.

According to one aspect of the invention, the modelling data of the marking line are of polynomial type, the degree of the polynomial being higher than or equal to three.

The invention also relates to a computer-program product comprising program instructions that implement at least one step of the method for detecting false positives, when the program instructions are executed by a computer.

The invention also relates to a readable data medium on which is stored the computer-program product.

Other advantages and features of the invention will become apparent on reading the description and the drawings.

FIG. 8b shows a display screen on which are shown marking lines of a lane of the vehicle, for which lane a false positive has been detected.

Figure 1:
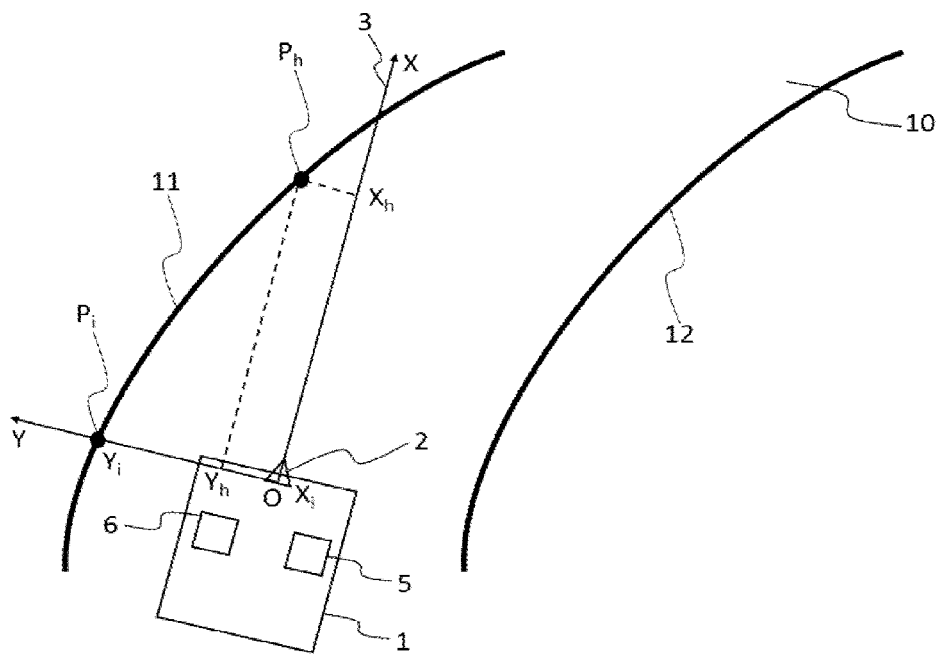
FIG. 1 is a schematic showing a vehicle equipped with an image-processing device of a camera being driven in a lane at a first instant in time.

FIG. 1 shows a vehicle 1, at a first instant T1 in time, being driven in a lane 10 comprising two marking lines 11, 12 that are located on either side of said vehicle 1.

The vehicle 1 comprises a camera 2 comprising an image-processing device able to deliver modelling data of a marking line 11, 12.

The modelling data allow the marking line 11, 12 to be modelled in a frame of reference 3 that is tied to the vehicle 1.

The modelling data allow a marking line 11, 12 to be modelled as a continuous curve, irrespectively of whether the marks on the ground (reflective strips for example) along the marking line 11, 12 are continuous or not.

Preferably, the modelling data are of polynomial type, the degree of the polynomial being higher than or equal to three. For example, the image-processing device is able to deliver the coefficients of the polynomial.

The tied frame of reference 3 comprises an ordinate axis Y substantially parallel to a lateral direction of the vehicle 1 and an abscissa axis X substantially parallel to a longitudinal direction of the vehicle, the abscissa axis X and the ordinate axis Y intersecting at an origin O.

The longitudinal direction of the vehicle 1 is for example a straight line passing through the center of the axles of the vehicle 1, the front of the vehicle and the rear of the vehicle.

Preferably, the frame of reference 3 is an orthogonal coordinate system.

The lateral direction of the vehicle 1 is perpendicular to the longitudinal direction of the vehicle 1 and for example a straight line passing through the front left door and through the front right door.

Advantageously, the origin O is located level with the camera 2 of the vehicle 1. The camera 2 is a front-view camera located at the front of the vehicle 1.

The marking line 11 comprises an initial point Pi the coordinates of which in the coordinate system 3 are represented by an abscissa and an ordinate and may be determined from the modelling data delivered by the image-processing device of the camera 2.

Advantageously, the abscissa and the ordinate of the origin O are equal to zero.

The vehicle 1 comprises a device 5 for detecting false positives, which is able to determine the ordinate of a point of the marking line 11, 12 from its abscissa.

In one preferred embodiment, the abscissa Xi of the initial point Pi is substantially equal to zero. The abscissa Xi is therefore substantially coincident with the origin O. The ordinate of the initial point Pi is a first distance Yi of the vehicle 1 to the marking line 11 at a first instant T1 in time.

The first distance Yi is the ordinate of the initial point Pi at the origin O. The first distance Yi is determinable from the modelling data of the marking line 11. The device 5 for detecting false positives is able to determine the first distance Yi from the modelling data of the marking line 11 delivered by the image-process device of the camera 2.

The marking line 11 also comprises a horizon point Ph the abscissa of which at the first instant T1 in time is a first abscissa Xh corresponding to the distance to be travelled by the vehicle 1 in a predefined horizon time dTh.

The vehicle 1 comprises a speed sensor 6. The device 5 for detecting false positives is able to gather, from said speed sensor 6, the speed of the vehicle at a set instant. From the vehicle speed, the device for detecting false positives is able to compute the distance to be travelled by the vehicle 1 in a predefined horizon time dTh.

The predefined horizon time dTh is preferably comprised between 0.9 seconds and 1.1 seconds, typically equal to 1 second.

For example, for a horizon time dTh equal to one second and a vehicle speed equal to 25 meters per second, the first abscissa Xh is equal to 25 meters.

The device 5 for detecting false positives is able to determine the ordinate, called the first ordinate Yh, of the horizon point Ph at the first instant T1 from the first abscissa Xh computed beforehand and from the modelling data of the marking line 11 delivered by the image-processing device of the camera 2.

Figure 2:
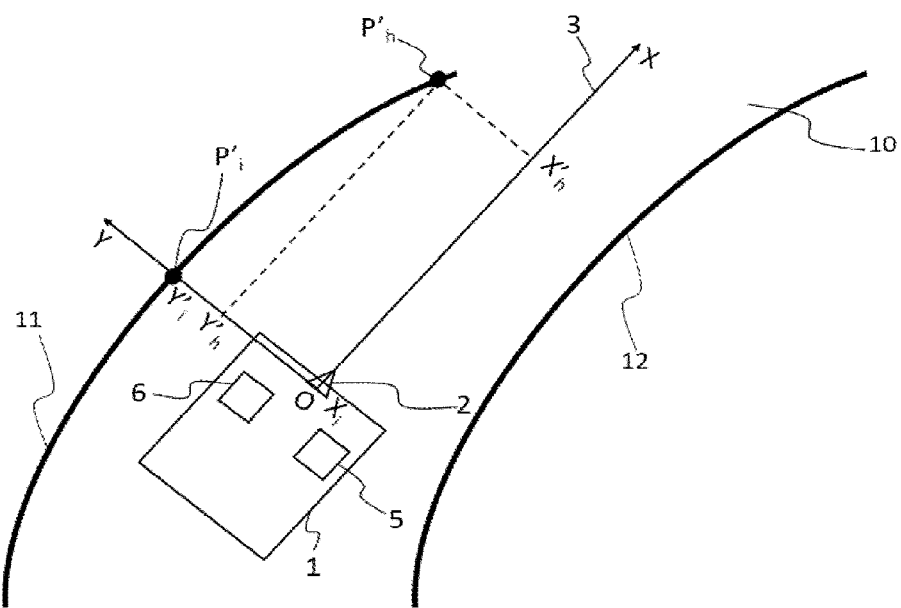
FIG. 2 is a schematic showing a vehicle equipped with an image-processing device of a camera being driven in a lane at a second instant in time.

FIG. 2 differs from FIG. 1 in that it shows the vehicle 1 being driven in the lane 10 at a second instant T2 in time. The first instant T1 is prior to the second instant T2. As the vehicle 1 is driven in the lane 10, the vehicle travels a non-zero distance in the lane 10 between the first instant T1 and the second instant T2.

The time difference DT, in absolute value, between the first instant T1 and the second instant T2 is preferably comprised between 1 millisecond and 150 milliseconds.

Since the frame of reference 3 is tied to the vehicle and the vehicle 1 has changed position in the lane 10, the marking line 11 is distant from the vehicle 1 by a second distance Y'i, at the second instant T2. The second distance Y'i of the vehicle 1 is the ordinate of an initial point P'I the abscissa Xi of which is therefore coincident with the origin O, as in FIG. 1.

The marking line 11 comprises a new horizon point P'h the abscissa of which at the second instant T2 in time is the second abscissa X'h corresponding to the distance to be travelled by the vehicle 1 in the predefined horizon time dTh at the second instant T2.

The first abscissa Xh and the second abscissa X'h are not necessarily equal but they are very close. Specifically, the horizon time dTh is a fixed value, but the speed of the vehicle 1 is not necessarily the same at the first instant T1 and at the second instant T2. However, the time difference DT, in absolute value, between the first instant T1 and the second instant T2 being smaller than 150 milliseconds, the difference between the first abscissa Xh and the second abscissa X'h is small.

For example, if the difference in the speed of the vehicle between the first instant T1 and the second instant T2 is equal to 0.05 meters per second, then the difference between the first abscissa Xh and the second abscissa X'h is equal to 0.05 meters, for a horizon time dTh equal to one second.

From the speed of the vehicle at the second instant t2, the device 5 for detecting false positives is able to compute the distance to be travelled by the vehicle 1 in a predefined horizon time dTh, this corresponding to the second abscissa X'h.

The device 5 for detecting false positives is able to determine the ordinate, called the second ordinate Y'h, of the horizon point P'h at the second instant T2 from the second abscissa X'h computed beforehand and from the modelling data of the marking line 11 delivered by the image-processing device of the camera 2.

Figure 3:
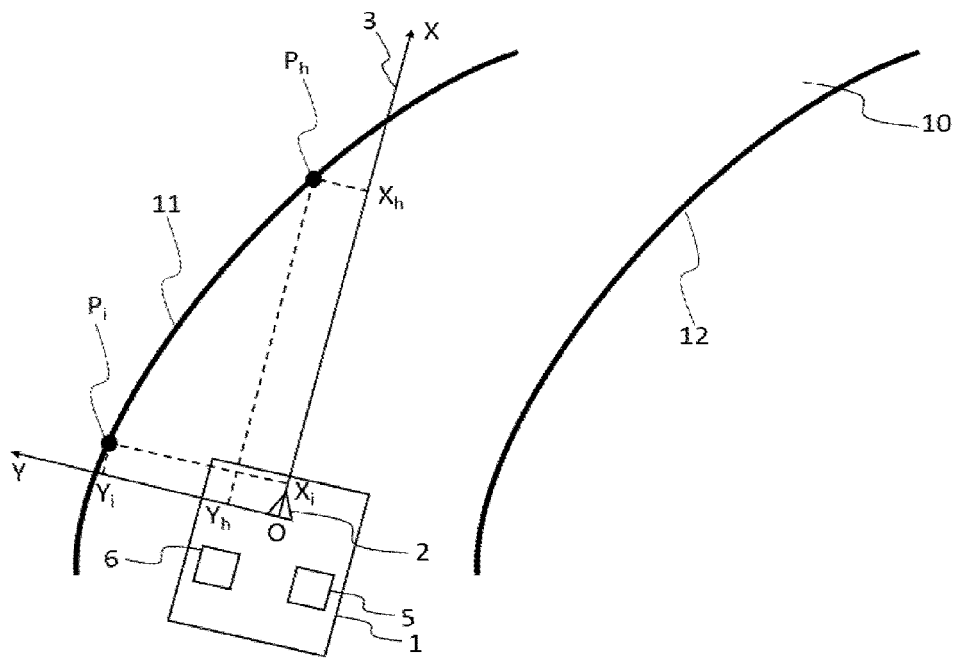
FIG. 3 is a schematic showing an alternative embodiment to FIG. 1.
Figure 4:
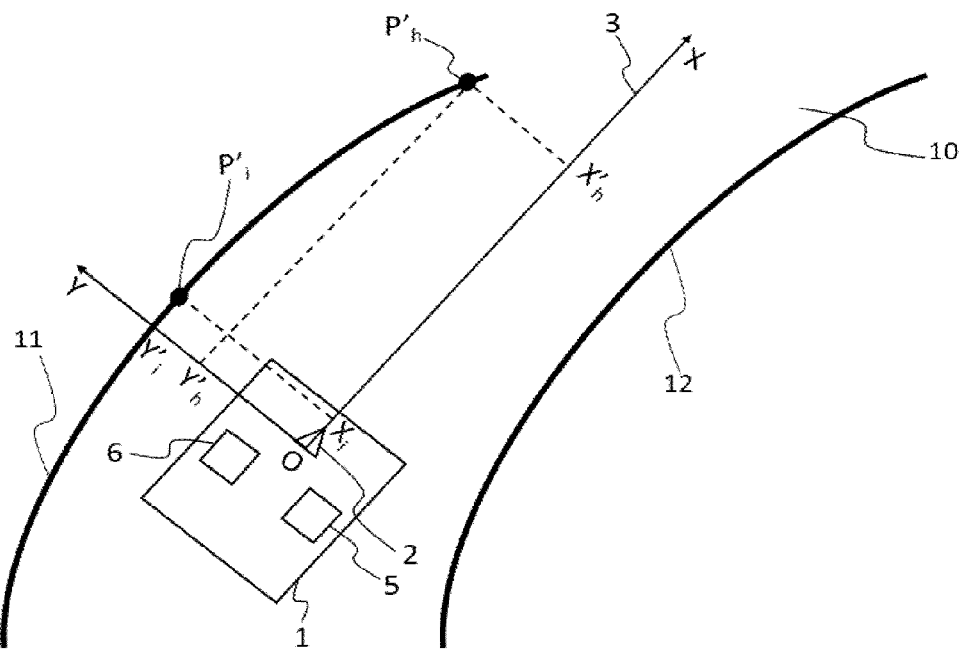
FIG. 4 is a schematic showing an alternative embodiment to FIG. 2.

FIGS. 3 and 4 show an alternative embodiment to FIGS. 1 and 2, respectively.

FIG. 3 differs from FIG. 1 in that the abscissa Xi of the initial point Pi is not coincident with the origin O. The abscissa Xi is at a predefined distance from the origin O.

As in FIG. 1, the first distance Yi of the vehicle 1 to the marking line 11 at the first instant T1 in time is defined by the ordinate of the point Pi.

The device 5 for detecting false positives is able to determine the first distance Yi from the abscissa Xi, which is preset and known, and from modelling data of the marking line 11 delivered by the image-processing device of the camera 2.

FIG. 4 differs from FIG. 2 in that the abscissa Xi of the initial point P'I is not coincident with the origin O. The abscissa Xi is the same predefined distance from the origin O as in FIG. 3.

As in FIG. 2, the second distance Y'i of the vehicle 1 to the marking line 11 at the second instant T2 in time is defined by the ordinate of the point P'i.

The device 5 for detecting false positives is able to determine the second distance Y'i from the abscissa Xi, which is preset and known, and from modelling data of the marking line 11 delivered by the image-processing device of the camera 2.

As shown in FIGS. 3 and 4, it may be advantageous to not have the origin O coincident with the abscissa Xi in the case where the camera 2 is not a front-view camera located at the front of the vehicle.

For example, the camera 2 is located on the roof of the vehicle 2. Advantageously, the abscissa Xi is the distance between the origin O located on the camera 2 and the front of the vehicle 2.

Figure 5:
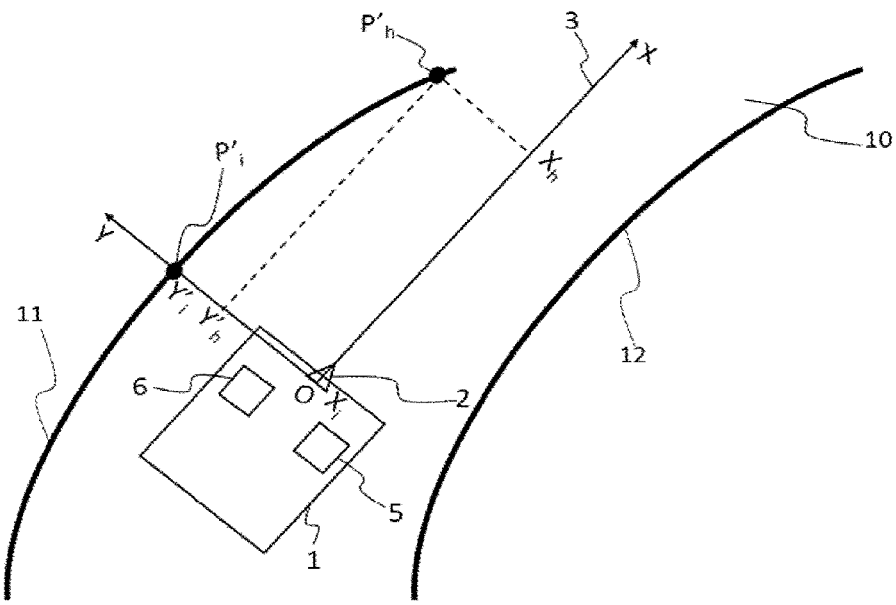
FIG. 5 is a schematic showing a variant of FIG. 2.

FIG. 5 is a variant of FIG. 2 that may also be applied to FIG. 4.

FIG. 5 differs from FIG. 2 in that the second ordinate Y'h at the second instant T2 is determined by the device 5 for detecting false positives from the first abscissa Xh computed at the first instant T1. The has the advantage that the first ordinate Yh and the second ordinate Y'h are determined using the same first abscissa Xh.

Figure 6:
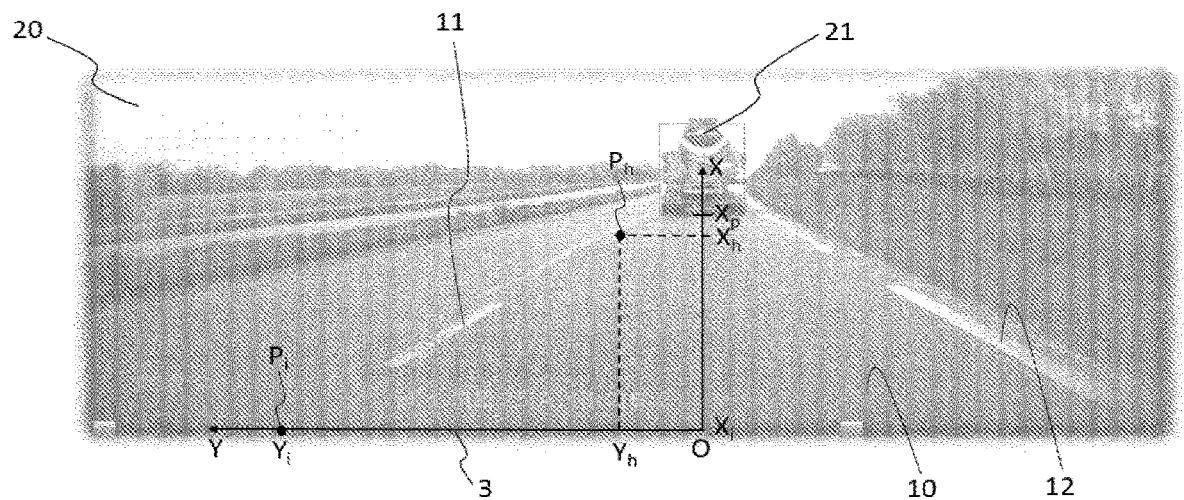
FIG. 6 is a camera image.

FIG. 6 is an example of an image 20 taken by the camera 6. The coordinate system 3 is superposed on the image 20 of the camera 6. The marking lines 11, 12 are discontinuous.

The origin point Pi and the horizon point Ph, which are located on the marking line 11, such as illustrated in FIG. 1, are shown.

Figure 7:
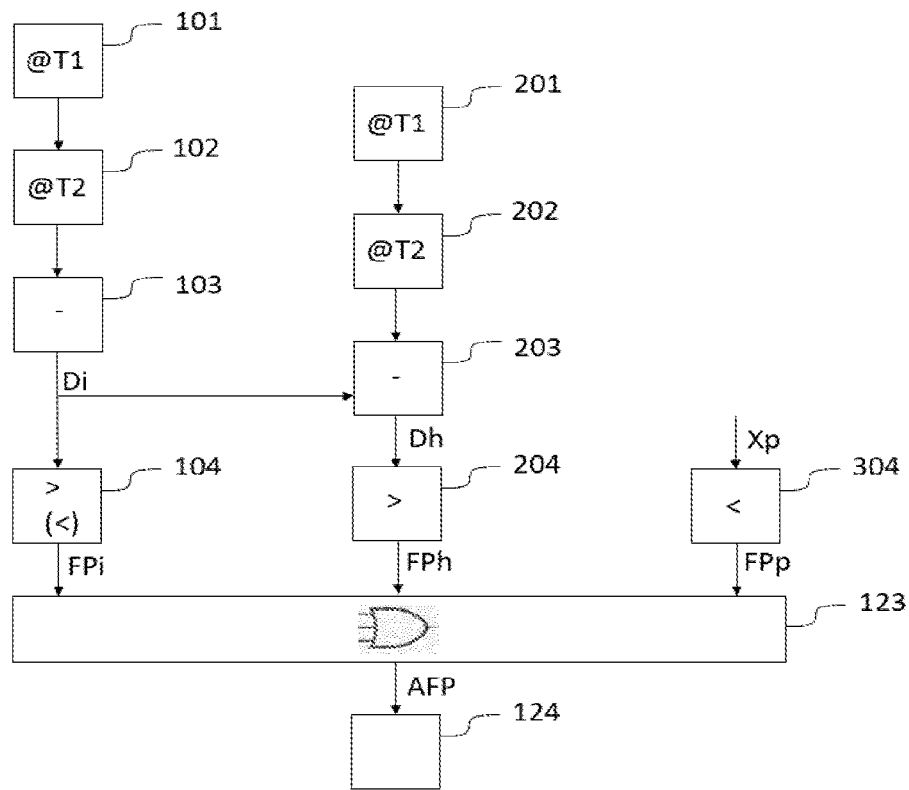
FIG. 7 is a schematic showing the steps of a method for detecting false positives of an image-processing device of a camera, according to the invention.

FIG. 7 illustrates a method for detecting false positives of an image-processing device of a camera 2 located onboard a vehicle 1 such as shown in FIGS. 1 to 5.

The method for detecting false positives allows false positives among a false initial-discontinuity positive FPi, a false horizon-discontinuity positive FPh and a false range positive FPp, to be detected.

To detect a false initial-discontinuity positive FPi, the method for detecting false positives comprises the following steps:

a first step 101 of determining, from the modelling data of the marking line 11, the first distance Yi of the vehicle 1 to the marking line 11, at the first instant T1, a second step 102 of determining, from the modelling data of the marking line 11, the second distance Y'i of the vehicle 1 to the marking line 11, at the second instant T2, an initial-discontinuity-computing step 103 in which an initial discontinuity Di is computed, the initial discontinuity Di being equal to the absolute value of the difference between the first distance Yi and the second distance Y'i, a step 104 of detecting a false initial-discontinuity positive, in which step the initial discontinuity Di is compared to a preset low initial threshold TBi, a false initial-discontinuity positive FPi being detected if the initial discontinuity Di is larger than the low initial threshold TBi.

In one preferred embodiment, the initial discontinuity Di is furthermore compared to a preset high initial threshold THi, a false initial-discontinuity positive being detected if the initial discontinuity Di is larger than the low initial threshold TBi and smaller than the high initial threshold THi. This allows false positives not to be detected in the case of a change of lane by the vehicle 1.

The low initial threshold TBi is equal to a value comprised between 0.1 meters and 0.3 meters, typically equal to 0.15 meters.

The high initial threshold THi is equal to a value comprised between 1.7 meters and 2.3 meters.

The time difference DT, in absolute value, between the first instant T1 and the second instant T2 is a value lower than or equal to quotient of the low initial threshold TBi divided by a lateral speed substantially equal to two meters per second.

Below a lateral speed of two meters per second, the lateral movement is considered to be unintentional. Above this speed, the lateral movement is considered to be intentional. It is therefore advantageous to choose a speed of two meters per second because this covers the involuntary lateral-movement scenarios.

The time difference DT, in absolute value, between the first instant T1 and the second instant T2 is larger than one millisecond in order to give the device for detecting false positives sufficient time to execute the steps of the method for detecting false positives.

For a low initial threshold TBi equal to 0.1 meters, the time difference DT, in absolute value, is therefore a value comprised between 1 millisecond and 50 milliseconds, which is the result of dividing 0.1 by 2.

For a low initial threshold TBi equal to 0.3 meters, the time difference DT, in absolute value, is therefore a value comprised between 1 millisecond and 150 milliseconds, which is the result of dividing 0.3 by 2.

To detect a false horizon-discontinuity positive FPh, the method for detecting false positives comprises the following steps:

a third step 201 of determining, from the modelling data of the marking line 11, the first ordinate Yh of a horizon point Ph of the marking line 11, at the first instant T1, a fourth step 202 of determining, from the modelling data of the marking line 11, the second ordinate Y'h of the horizon point P'h of the marking line 11 at the second instant T2, a horizon-discontinuity-computing step 203 in which a horizon discontinuity Dh is computed, the horizon discontinuity Dh being equal to the absolute value of the difference between the first ordinate Yh and the second ordinate Yh', minus the initial discontinuity Di, a step 204 of detecting a false horizon-discontinuity positive, in which step the horizon discontinuity Dh is compared to a preset horizon threshold THh, a false horizon-discontinuity positive FPh being detected if the horizon discontinuity Dh is larger than the horizon threshold THh.

The first ordinate Yh of the horizon point Ph and the second ordinate Y'h of the horizon point P'h are determined from the first abscissa Xh or the second abscissa X'h, which are computed as explained in the description of FIGS. 2, 4 and 5, and from the modelling data of the marking line 11.

The horizon threshold THh is comprised between 0.2 meters and 1 meter.

The modelling data comprise an optimal visibility distance Xp.

An example of an optimal visibility distance Xp is given in FIG. 6. A truck 21 is being driven in the lane 10. To the camera 6, the truck 21 is an obstacle in the lane 10. The truck 21 obstructs a portion of the marking lines 11, 12. In this example, the optimal visibility distance Xp substantially corresponds to the distance between the truck 21 and the camera 6.

To detect a false range positive FPp, the method for detecting false positives furthermore comprises a step 304 of detecting a false range positive, in which step the optimal visibility distance Xp is compared to a range threshold THp equal to the distance to be travelled by the vehicle in a predefined range time dTp, a false range positive FPp being detected if the optimal visibility distance Xp is smaller than the range threshold THp.

Advantageously, the step 304 of detecting a false range positive is carried out at the second instant T1 and/or at the second instant T2.

The predefined range time dTp is a value comprised between 0.8 seconds and 0.99 seconds, typically equal to 0.95 seconds.

For example, for a range time dTp equal to 0.95 seconds and a vehicle speed equal to 25 meters per second, the range threshold THp is equal to 23.75 meters, which is the result of multiplying 0.95 by 25.

It is of course considered as equivalent to convert the optimal visibility distance Xp into a time that the vehicle 1 would take to travel said optimal visibility distance Xp and to compare this said time to the range threshold THp.

A false positive is detected if any one among a false initial-discontinuity positive FPi, a false horizon-discontinuity positive FPh and a false range positive FPp is detected.

Advantageously, if a false positive is detected, the method for detecting false positives furthermore comprises a step 124 of displaying a visual warning to a user of the vehicle 1, in order to warn the user of a temporary loss of detection of the marking line 11 by the camera 2.

For example, the vehicle 1 comprises a display screen 100 on which the marking lines 11, 12 of the lane 10 are represented. If a false positive is detected for the marking line 11 by the device 5 for detecting false positives, then the representation 110 of the marking line 11 on the display screen 100 is modified, for example via a change in color. The representation 120 of the marking line 12 is not modified if a false positive has not been detected for the marking line 12.

Figure 8A:
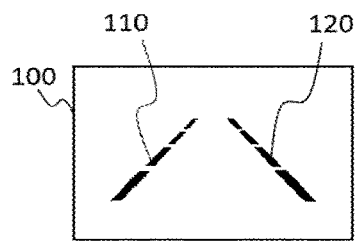
FIG. 8a shows a display screen on which are shown marking lines of a lane of the vehicle, for which lane no false positives have been detected.
Figure 8A:
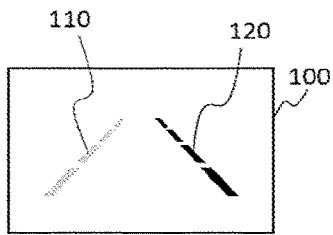

In FIG. 8a, no false positives have been detected, and the representation 110, 120 of the two marking lines 11, 12 is black in color.

In FIG. 8b, a false positive has been detected for the marking line 11. The representation 110 of the marking line 11 is gray in color, the representation 120 of the marking line 12 remaining unchanged.

The visual-warning embodiment is non-limiting. The visual warning may be a pictogram, an indicator light, etc.

The device 5 for detecting false positives comprises a program comprising program instructions that implement the steps of the method for detecting false positives.

The device 5 for detecting false positives is connected to the speed sensor 6 of the vehicle 1 and to the image-processing device of the camera 2, preferably by a wired link. The connection between the speed sensor 6 and the device 5 for detecting false positives may be direct or indirect. For example, an intermediate processor may be located between the speed sensor 6 and the device 5 for detecting false positives, the intermediate processor allowing data to be filtered and verified before their transmission to the device 5 for detecting false positives.

The communication protocol employed between the speed sensor 6 and the device 5 for detecting false positives is for example a CAN protocol.

The communication protocol employed between the camera 2 and the device 5 for detecting false positives is for example a CAN protocol.

Advantageously, the execution of the program instructions that implement the steps of the method for detecting false positives is looped with a period equal to the time difference DT. The first time the program is executed, the first instant T1 corresponds to an instant of said first period, and the second instant T2 corresponds to an instant of said second period. The second time the program is executed, the first instant T1 corresponds to said instant of said second period, and the second instant T2 corresponds to an instant of said third period, and so on.

The above examples and description are given taking the marking line 11 as example. By analogy, the same examples and explanations apply to the marking line 12.

The invention claimed is:

1. A method for detecting false positives of an image-processing device of a camera located on-board a vehicle, said image-processing device being configured to deliver modelling data of a marking line of a lane of the vehicle in a frame of reference that is tied to the vehicle, the method for detecting false positives comprising:

determining, from the modelling data of the marking line, a first distance of the vehicle to the marking line at a first instant in time;

determining, from the modelling data of the marking line, a second distance of the vehicle to the marking line at a second instant in time;

computing an initial discontinuity, the initial discontinuity being equal to an absolute value of the difference between the first distance and the second distance; and detecting a false initial-discontinuity positive, in which the initial discontinuity is compared to a preset low initial threshold, a false initial-discontinuity positive being detected when the initial discontinuity is larger than the low initial threshold, the low initial threshold being equal to a value comprised between 0.1 meters and 0.3 meters, the time difference between the first instant and the second instant being smaller than or equal to the quotient of the low initial threshold divided by a lateral speed substantially equal to two meters per second, the time difference being larger than one millisecond.

2. The method for detecting false positives as claimed in claim 1, further comprising comparing the initial discontinuity to a preset high initial threshold, a false initial-discontinuity positive being detected when the initial discontinuity is larger than the low initial threshold and smaller than the high initial threshold.

3. The method for detecting false positives as claimed in claim 2, wherein the high initial threshold is equal to between 1.7 meters and 2.3 meters.

4. The method for detecting false positives as claimed in claim 1, wherein the frame of reference comprises an ordinate axis substantially parallel to a lateral direction of the vehicle and an origin located level with the camera of the vehicle, the first distance and the second distance corresponding to the ordinate at the origin of a point of the marking line at the first instant and at the second instant in time, respectively.

5. The method for detecting false positives as claimed in the claim 4, wherein the frame of reference comprises an abscissa axis substantially parallel to a longitudinal direction of the vehicle, the method for detecting false positives furthermore comprising:
   determining, from the modelling data of the marking line, a first ordinate of a horizon point of the marking line the first abscissa of which is a distance corresponding to the distance to be travelled by the vehicle in a predefined horizon time at the first instant in time;
   determining, from the modelling data of the marking line, a second ordinate of a horizon point of the marking line the second abscissa of which is a distance corresponding to the distance to be travelled by the vehicle in said predefined horizon time at the second instant in time;
   computing a horizon discontinuity, the horizon discontinuity being equal to an absolute value of the difference between the first ordinate and the second ordinate, minus the initial discontinuity; and
   detecting a false horizon-discontinuity positive, in which the horizon discontinuity is compared to a preset horizon threshold, a false horizon-discontinuity positive being detected when the horizon discontinuity is larger than the horizon threshold.

6. The method for detecting false positives as claimed in claim 5, wherein the predefined horizon time is between 0.9 seconds and 1.1 seconds and the horizon threshold is between 0.2 meters and 1 meter.

7. The method for detecting false positives as claimed in claim 1, wherein the modelling data comprises an optimal visibility distance, and the method for detecting false positives further comprises detecting a false range positive, in which the optimal visibility distance is compared to a range threshold equal to the distance to be travelled by the vehicle in a predefined range time, a false range positive being detected when the optimal visibility distance is smaller than the range threshold.

8. The method for detecting false positives as claimed in claim 7, wherein the predefined range time is between 0.8 seconds and 0.99 seconds.

9. The method for detecting false positives as claimed in claim 1, further comprising displaying a visual warning to a user of the vehicle when a false positive among a false initial-discontinuity positive, a false horizon-discontinuity positive, and a false range positive is detected in order to warn the user of a temporary loss of detection of the marking line by the camera.

10. A non-transitory computer readable medium storing program instructions that, when executed by a computer, causes the computer to execute the method for detecting false positives as claimed in claim 1.

* * * * *